(12) United States Patent
DeSimone

(10) Patent No.: US 11,312,285 B2
(45) Date of Patent: *Apr. 26, 2022

(54) TAILGATE WITH INTEGRATED LOADING RAMP SYSTEM

(71) Applicant: Steve DeSimone, Hilton Head, SC (US)

(72) Inventor: Steve DeSimone, Hilton Head, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/860,466

(22) Filed: Apr. 28, 2020

(65) Prior Publication Data

US 2020/0254917 A1 Aug. 13, 2020

Related U.S. Application Data

(63) Continuation of application No. 15/914,423, filed on Mar. 7, 2018, now Pat. No. 10,668,848.

(60) Provisional application No. 62/468,689, filed on Mar. 8, 2017.

(51) Int. Cl.
*B60P 1/43* (2006.01)
*B62D 33/027* (2006.01)
*B62D 33/03* (2006.01)

(52) U.S. Cl.
CPC .......... *B60P 1/435* (2013.01); *B62D 33/0273* (2013.01); *B62D 33/03* (2013.01)

(58) Field of Classification Search
CPC ...... B60P 1/435; B62D 33/03; B62D 33/0273
USPC .......................................................... 296/61
See application file for complete search history.

(56) References Cited

U.S. PATENT DOCUMENTS

| | | |
|---|---|---|
| 3,510,015 A | 5/1970 | Roshaven |
| 4,114,944 A | 9/1978 | Joynt et al. |
| 4,305,694 A | 12/1981 | Chan |
| 4,884,838 A | 12/1989 | Slater |
| 5,425,564 A | 6/1995 | Thayer |
| 5,468,038 A | 11/1995 | Sauri |
| 5,732,995 A | 3/1998 | Piccariello |
| 6,575,516 B2 | 6/2003 | Webber |
| 6,749,246 B2 | 6/2004 | Landwehr |
| 6,991,277 B1 | 1/2006 | Esler |
| 6,994,363 B2 | 2/2006 | Seksaria et al. |
| 7,350,843 B2 | 4/2008 | Meyers et al. |
| 7,628,439 B1 | 12/2009 | Strong |

(Continued)

FOREIGN PATENT DOCUMENTS

| | | |
|---|---|---|
| CA | 2398799 C | 8/2001 |
| RU | 53985 U1 | 6/2006 |
| WO | 2016/028884 A1 | 2/2016 |

OTHER PUBLICATIONS

PCT Search Report & Written Opinion dated Jun. 7, 2018 for Application No. PCT/US2018/021445.

*Primary Examiner* — D Glenn Dayoan
*Assistant Examiner* — Dana D Ivey
(74) *Attorney, Agent, or Firm* — The Dobrusin Law Firm, P.C.; Bryan S. Lemanski

(57) ABSTRACT

A tailgate system for a vehicle having a body defining a rear cargo area and an opening, the tailgate system comprising: (a) a tailgate door adapted to pivotally engage the rear cargo area in a first direction between a closed position and an open position; (b) a bed extension pivotally engaged to the tailgate door; and (c) one or more ramps, wherein the bed extension is pivotally engaged to the tailgate door and adapted to pivot from a closed position to one or more open positions; and wherein the one or more ramps removably attach to the bed extension.

19 Claims, 9 Drawing Sheets

(56) References Cited

U.S. PATENT DOCUMENTS

| | | | |
|---|---|---|---|
| 7,712,811 B2 * | 5/2010 | Heaman | B62D 33/0273 |
| | | | 296/26.08 |
| 8,075,038 B2 | 12/2011 | Zielinsky | |
| D674,162 S | 1/2013 | Gooch | |
| 9,452,793 B1 | 9/2016 | Quick | |
| 9,878,652 B2 | 1/2018 | DeSimone | |
| 10,518,687 B2 | 12/2019 | DeSimone | |
| 10,668,848 B2 * | 6/2020 | DeSimone | B62D 33/0273 |
| 2008/0034512 A1 | 2/2008 | Meyers | |
| 2014/0064896 A1 | 3/2014 | Parmar | |
| 2016/0031353 A1 * | 2/2016 | DeSimone | B60P 1/435 |
| | | | 296/57.1 |
| 2016/0144759 A1 | 5/2016 | DiBlasio et al. | |
| 2017/0341560 A1 | 11/2017 | Stojkovic et al. | |

* cited by examiner

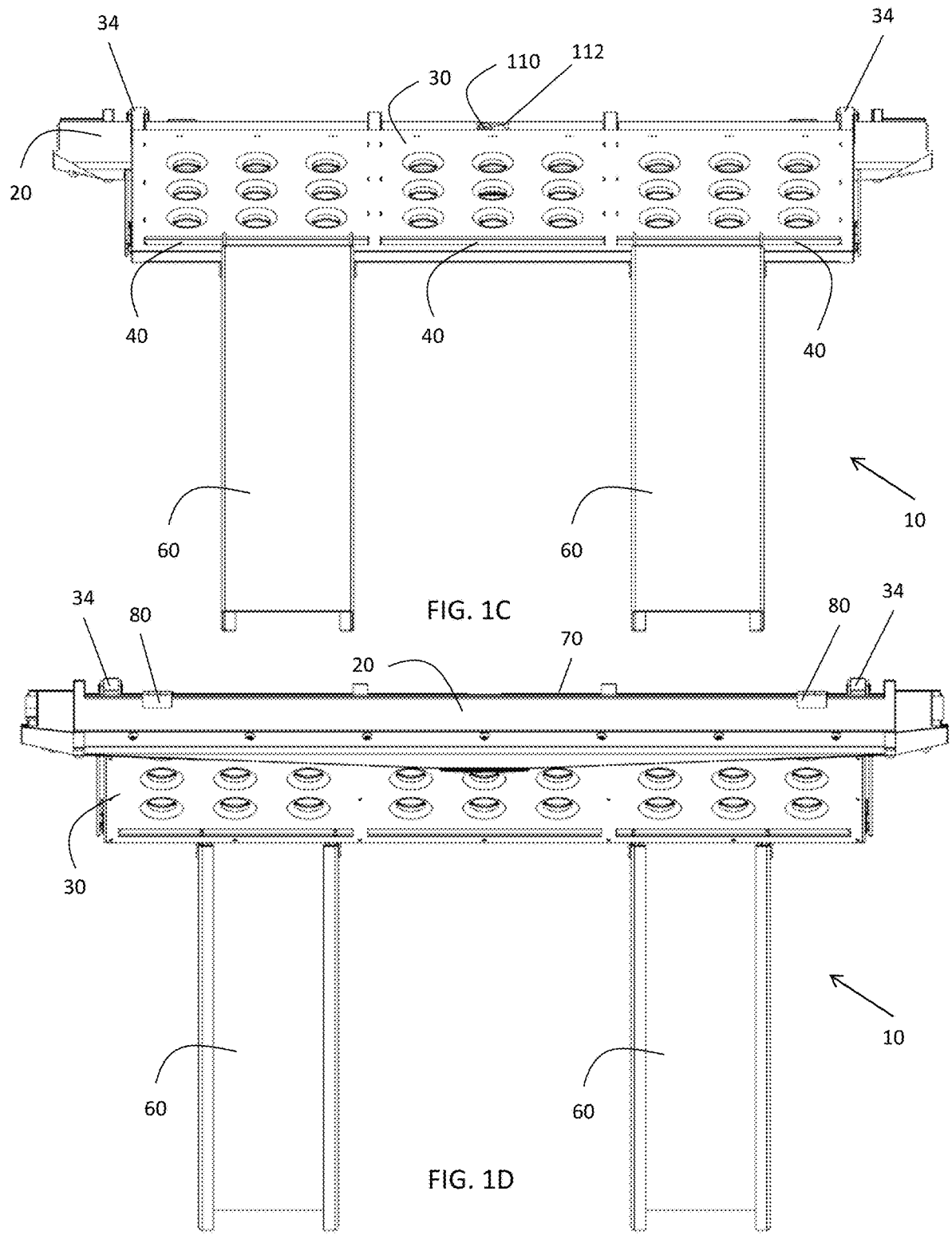

TAILGATE WITH INTEGRATED LOADING RAMP SYSTEM

FIELD

The present teachings generally relate to vehicles used for transporting cargo, such as a pickup truck including a tailgate. More particularly, the present disclosure relates to a functional, integrated, and flexible tailgate for use on a pickup truck or other types of vehicles including a cargo area with an opening.

BACKGROUND

Vehicles are frequently used to transport cargo between destinations. These vehicles may include a bed area to provide space for oversized items. As such, a vehicle bed may include a tailgate to open and close a rear segment of the bed for easier loading and unloading of cargo. However, the cargo being transported may be heavy, bulky, or otherwise difficult to load and unload from the vehicle, even with a tailgate. Attempts have been made to create devices that alleviate the difficulties loading and unloading cargo. Some examples of such devices may be found in U.S. Pat. Nos. 5,425,564 and 7,350,843.

Therefore, it would be attractive to have a tailgate system for a transportation vehicle with an integrated ramp for easier loading and unloading of cargo. It would also be attractive to have the tailgate system include an integrated and adjustable positioning system relative to the bed of a vehicle. Additionally, it would be attractive to have the tailgate system include a bed extension for additional cargo space. Furthermore, it would be attractive to have the tailgate system be substantially integrated and collapsible to maintain a footprint similar to that of a standard tailgate.

SUMMARY

The present teachings meet one or more (if not all) of the present needs by providing a tailgate system for a vehicle having a body defining a rear cargo area and an opening, the tailgate system comprising: (a) a tailgate door adapted to pivotally engage the rear cargo area in a first direction between a closed position and an open position; (b) a bed extension; and (c) one or more ramps; wherein the bed extension is pivotally engaged to the tailgate door and adapted to pivot from a closed position to one or more open positions; and wherein the one or more ramps removably attach to the bed extension.

The present teachings provide a tailgate system for a vehicle having a body defining a rear cargo area and an opening, the tailgate system comprising: (a) a tailgate door adapted to pivotally engage the rear cargo area in a first direction between a closed position and an open position; (b) a bed extension including one or more slots; and (c) one or more ramps; wherein one or more lug portions of the bed extension are pivotally engaged and secured to one or more bosses of the tailgate door by one or more fasteners; wherein the bed extension can pivot relative to the tailgate door from a closed position to an upright position approximately 90 degrees from a top surface of the tailgate door; wherein the bed extension can further pivot to a semi-open position approximately 180 degrees from the top surface of the tailgate door; wherein the bed extension can further pivot to a fully open position approximately 210 degrees from the top surface of the tailgate door; and wherein one or more engaging features of the one or more ramps removably attach to the one or more slots of the bed extension.

Additionally, the present teachings provide a tailgate system for a vehicle having a body defining a rear cargo area and an opening, the tailgate system comprising: (a) a tailgate door adapted to pivotally engage the rear cargo area in a first direction between a closed position and an open position; (b) a bed extension including one or more slots; (c) one or more ramps; (d) a crossmember positioned across a length of the tailgate door, recessed from the top surface of the tailgate door; and (e) a panel pivotally engaged to the top surface of the tailgate door by one or more hinges; wherein one or more lug portions of the bed extension are pivotally engaged and secured to one or more bosses of the tailgate door by one or more fasteners; wherein the bed extension can pivot relative to the tailgate door from a closed position to an upright position approximately 90 degrees from a top surface of the tailgate door; wherein the bed extension can further pivot to a semi-open position approximately 180 degrees from the top surface of the tailgate door; wherein the bed extension can further pivot to a fully open position approximately 210 degrees from the top surface of the tailgate door; wherein one or more engaging features of the one or more ramps removably attach to the one or more slots of the bed extension; and wherein the one or more ramps can be stored within a cavity of the tailgate door and secured beneath the crossmember and panel.

The present teachings provide a tailgate system that has an integrated ramp for easier loading and unloading of cargo. The present teachings further provide a tailgate system that includes an integrated and adjustable positioning system relative to the bed of the vehicle. Additionally, the present teachings provide a tailgate system that includes a bed extension for additional cargo space that is substantially integrated and collapsible to maintain a footprint similar to that of a standard tailgate.

BRIEF DESCRIPTION OF THE DRAWINGS

FIG. 1C illustrates a front view of a tailgate system in a fully-open position;

FIG. 1D illustrates a rear view of a tailgate system in a fully-open position;

DETAILED DESCRIPTION

Figure 1A:
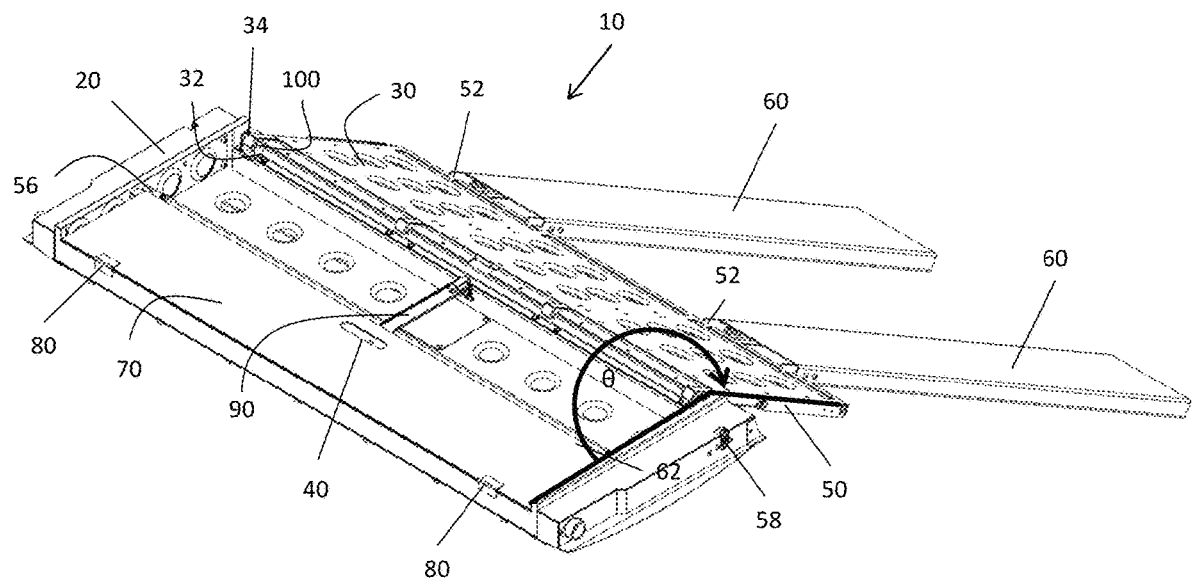
FIG. 1A illustrates a perspective view of a tailgate system in a fully-open position.

This application claims the benefit of U.S. 62/468,689 filed on Mar. 8, 2017, all of which is hereby incorporated by reference herein for all purposes.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide an improved tailgate system. The tailgate system functions to provide users a quicker and easier way to load and unload cargo from a transportation vehicle, such as a pickup truck or other automotive vehicle including a storage bed. The tailgate system functions to provide additional workspace or loading space. The tailgate system functions to maintain multiple user-desired storage positions. Individual components may be removed, detached, added, connected, or a combination thereof to the tailgate system. The tailgate system may be structurally rigid to support the weight of heavy cargo during loading, transportation, unloading, or a combination thereof. All or a portion of the tailgate system may be made from or include: metals, such as aluminum or steel; plastic; a polymer; an overmolded material; a composite; a natural material; a synthetic material; an alloy; or a combination thereof. All or a portion of the tailgate system may be injection-molded, stamped, or cast. The tailgate system may have different components that are each made of different material. For example, the tailgate door may be made of metal and the bed extension may be made of a high-durability plastic. The tailgate system may vary in size and shape. For example, the tailgate system may be sized and shaped substantially similar to a standard tailgate designed for one or more original equipment manufacturers (OEMs). The tailgate system may include a tailgate door. The tailgate system may include a bed extension.

The tailgate door may function to create a barrier for cargo stored in a transportation vehicle. The tailgate door may function to provide additional storage or workspace for a transportation vehicle. The tailgate door may function to provide access to the storage space of a transportation vehicle. The tailgate door may be secured along an outer perimeter of the storage space. The tailgate door may be removably attached to the storage space. The tailgate door may be pivotally engaged to the storage space to allow for opening and closing the tailgate door. The tailgate door may be pivotally engaged using one or more protrusions received by the storage space. The one or more protrusions may allow for pivotal rotation of the tailgate door relative to the storage space. For example, round protrusions on opposing sides of the tailgate door may extend into holes of the storage space to allow rotation of the protrusions within the holes, thereby allowing pivoting of the tailgate door relative to the storage space. The tailgate door may be locked to the storage space in a closed position using one or more locking mechanisms. The locking mechanisms may be a latch, hook, pin, shaft, key, any other locking mechanism used in the automotive industry, or a combination thereof. The tailgate door may include a cavity for storing additional components. For example, one or more ramps of the tailgate system may be stored within the cavity. The cavity may vary in shape and size. The cavity may include a crossmember for additional structural rigidity and to ensure stored components remain intact during movement of the tailgate door. The tailgate door may vary in size and shape. For example, the tailgate door may be sized and shaped substantially similar to a standard tailgate designed for one or more original equipment manufacturers (OEMs). The tailgate door may include one or more components to aid in movement of the tailgate door (i.e., during opening and closing of the tailgate door relative to a vehicle bed). For example, the tailgate door may include a torsion rod to mitigate a portion of the weight of the tailgate door a user may feel during opening and closing of the tailgate door. The torsion rod may mitigate about 15% or more of the weight, about 30% or more of the weight, or about 45% or more of the weight of the tailgate door. The torsion rod may mitigate about 90% or less of the weight, about 75% or less of the weight, or about 60% or less of the weight of the tailgate door. The tailgate door may include one or more features incorporated into the standard tailgate designed for one or more OEMs. For example, the tailgate door may include a backup camera, a power locking actuator, an integrated tailgate step, a backup sensor, a power-assist tailgate actuator, or a combination thereof. The tailgate door may be pivotally engaged to a bed extension.

The bed extension may function to provide additional storage or workspace for a transportation vehicle. The bed extension may function to secure oversized cargo during transportation. The bed extension may function to provide a partial walkway into the storage space. One or more lug portions of the bed extension may be received by, and secured to, one or more bosses of the tailgate door using one or more fasteners. The one or more fasteners may be a bolt, screw, pin, lug, rivet, latch, hook, stud, or a combination thereof. The one or more fasteners may be accompanied by one or more washers, nuts, or both. The one or more lug portions and the one or more bosses may be integrally formed with, or additional attached components of, the tailgate door, the bed extension, or both. For example, the one or more bosses may be recessed from a surface of the tailgate door so that, when the bed extension is in a closed position (i.e., the bed extension abuts the tailgate door), the bed extension, the one or more bosses, or both are substantially flush with the surface of the tailgate door. The one or more fasteners may be a screw, bolt, rivet, hook, stud, pin, retaining ring, or a combination thereof. The bed extension may include one or more holes, one or more perforations, or both that allows for moisture, debris, or both to drain through the bed extension. The mating of the bed extension and tailgate door allow for unobstructed pivotal engagement to move the bed extension to a desired position relative to the tailgate door.

The tailgate door may include one or more notches so that one or more lug portions of the bed extension pivot into the one or more notches of the tailgate door to allow for further rotational range. The notches may be shaped substantially similar to the one or more lug portions, or may be oversized to ensure that the one or more lug portions are received by the notches during pivoting. The notches may be integrally formed with the tailgate door. The notches may recess from one or more surfaces of the tailgate door. For example, the notches may be recessed so that the bed extension pivots relative to the tailgate door free of a pivot point protruding from a surface of the tailgate door (i.e., the one or more bosses are recessed from a surface of the tailgate door).

The notches may allow for the bed extension to move to a plurality of positions relative to the tailgate door. For example, when the tailgate door is in an open position, the bed extension may be positioned: in a closed position approximately 0 degrees from a top surface of the tailgate door; in an upright position approximately 90 degrees from the top surface of the tailgate door; in a semi-open position approximately 180 degrees from the top surface of the tailgate door; in a fully-open position approximately 210 degrees from the top surface of the tailgate door; or a combination therefore. Each position may provide different functionality. For example, when the bed extension is in an upright position, the bed extension may function to secure oversized cargo during transportation. However, when the bed extension is in a fully-open position, the bed extension may function to provide a partial walkway into the storage space to load and unload cargo. The bed extension may be a substantially similar size and shape when compared to the tailgate door. The bed extension may be positioned substantially flush to a surface of the tailgate door when in the closed position to minimize obstruction within the storage area. The bed extension may be solid or hollow. The bed extension may be structurally rigid to support the weight of oversized cargo. The bed extension may be maintained in a desired position using one or more blocks positioned beneath the one or more lug portions of the bed extension.

The one or more blocks may function to support the bed extension. The one or more blocks may support the one or more lug portions of the bed extension or any other portion of the bed extension. For example, the blocks may be positioned directly beneath the lug portions of the bed extension so that the lug portions rest on the blocks, or the blocks may be positioned underneath a peripheral edge of the bed extension to maintain the position of the bed extension.

The one or more blocks may vary in size and shape to maintain a desired position. For example, the blocks may be shaped so that a surface of the blocks are substantially flush with a surface of the tailgate door so that, when the bed extension rests on the blocks, the bed extension maintains a semi-open position relative to the tailgate door (i.e., about 180 degrees from the top surface of the tailgate door). However, the blocks may be shaped at any dimensions to maintain a desired angle of the bed extension to the tailgate door (i.e., greater than about 180 degrees, less than about 180 degrees, or both). The notches of the tailgate door may be integrally formed with a portion of the blocks. For example, the blocks may include a cutout that forms the notch so that, when the blocks are in a disengaged position, only the notches are exposed within windows of the channel. The blocks may be made of any material that supports the weight of the bed extension, additional cargo, users, or a combination thereof. The blocks may be made of a material that is substantially similar to the material of the bed extension, the tailgate door, or both.

The blocks may be interconnected via one or more rods extending between the blocks. The rods may function to move the blocks simultaneously between an engaged position and a disengaged position. For example, the blocks may be daisy-chained in a substantially linear position by a plurality of rods extending between opposing ends of each block so that, when a handle connected to the blocks is moved, the blocks move simultaneously in the desired direction. The rods may interconnect all of the blocks or only a portion of the blocks. For example, a first set of rods may interconnect approximately 50% of the blocks while a second set of rods may interconnect approximately 50% of the blocks so that each set of rods may be moved simultaneously together, in opposing directions to one another, or both. The rods may be shaped similar to the blocks or may be dissimilar. For example, the rods may have a diameter less than the blocks. The rods may be substantially cylindrical or may be a shape other than cylindrical. The rods may be integrally formed with the blocks or may be connected to the blocks by adhesives, mechanical fasteners, or both. The rods may be threaded to screw into a mating thread of one or more holes in the blocks. The rods may be structurally rigid or compressible. The rods may move the blocks through a channel of the tailgate door.

The channel may function to house the blocks when in a disengaged position. The channel may function to guide the blocks during movement. For example, the blocks may be positioned within the channel in a disengaged position (i.e., when the blocks are not located beneath the lug portions of the bed extension so that the lug portions may extend into the notches and reach the fully-open position) so that, when a handle is moved, the blocks move out of the channel into an engaged position substantially within the notches so that the lug portions of the bed extension rest on the blocks to maintain a semi-open position. The channel may be shaped substantially similar to the blocks or more be dissimilar. The channel may be U-shaped, V-shaped, D-shaped, G-shaped, circular, or a combination thereof. The channel may be substantially hollow to allow the blocks to move through the channel. The channel may be integrally formed with the tailgate door or may be connected to the tailgate door via a secondary assembly operation. The channel may be located along a peripheral edge of the tailgate door near the notches of the tailgate door. The channel may extend substantially along an entire edge of the tailgate door (i.e., substantially along an entire length of the tailgate door, width of the tailgate door, or both). The channel may include one or more tracks within the channel.

The track may function to guide a handle connected to the rods, blocks, or both. For example, the track may guide a handle directly or indirectly connected to the blocks so that, when the handle is moved along the track, the blocks are moved between an engaged position and a disengaged position. The tracks may be shaped substantially similar to a handle or may be different. The tracks may be stamped directly into the channel. The tracks may be cut out of the channel using laser cutting, scoring, water cutting, or a combination thereof. The track may include terminating ends to prevent the handle from moving past one or more desired positions. The track may define a distance the blocks travel by determining a correlated distance of travel of the handle within the track. For example, the slot may allow for approximately 20 cm of travel of the handle, which results in approximately 20 cm of travel of the blocks. The handle may travel about 10 cm or more, about 20 cm or more, or about 30 cm or more within the track. The handle may travel about 60 cm or less, about 50 cm or less, or about 40 cm or less within the track. The tracks may be integrally formed with the channel. For example, the channel may include a track that guides a handle connected to the blocks to move the blocks between the engaged and disengaged positions.

The handle may function to directly or indirectly attach to the blocks, rods, or both so that a user may manually move the blocks between an engaged position and a disengaged position. The handle may extend through a slot of the channel and connect to the rods, blocks, or both. The handle may move within the slot to adjust the position of the blocks. The handle may be a level, grip, knob, arm, pin, rope, hook, or a combination thereof. The handle may allow a user to move the blocks from a engaged position to a disengaged position so that the lug portions of the bed extension rest within the notches of the tailgate door in a fully-open position, free of obstruction of from the blocks. When in the open position, one or more ramps may be connected to one or more slots of the bed extension.

The one or more slots may function as an attachment point for one or more ramps, one or more accessories, or both. The slots may function to provide a handle for a user to adjust the position of the bed extension, one or more panels of the bed extension, or both. The slots may be positioned along a peripheral edge of the bed extension. The slots may be positioned away from one or more peripheral edges of the bed extension (i.e., near a center area of the bed extension). The slots may be rectangular, oval, square, triangular, round, trapezoidal, or a combination thereof. A plurality of slots may be uniform in shape or may vary. The slots may include a rounded edge to provide users a smooth surface to grab. The slots may be integrally formed with the bed extension, the one or more panels, or both. For example, the slots may be stamped out of the material of the bed extension, the one or more panels, or both. The slots may include a friction material to increase friction between the one or more ramps, the one or more accessories, or both. For example, the slots may be coated with a rubber and/or silicone material to increase friction. The slots may be used to move the bed extension to a desired position, whereby one or more latches attached to one or more receiving features of the tailgate door secure the bed extension in the desired position.

The one or more latches may function to provide additional structural support and to maintain the bed extension in a desired position relative to the tailgate door. The one or more latches may be pivotally secured to one or more outer sides of the bed extension and removably secured to one or more receiving features of the tailgate door. For example, a proximal end of the one or more latches may be fastened to the bed extension while the distal end of the one or more latches may be removably secured to the one or more receiving features of the tailgate door by an engaging feature. The engaging feature may be a hook mechanism, slot, clip, connector, press-fit, thread, or a combination thereof.

The tailgate system may further include one or more ramps. The one or more ramps may function to provide access to the storage area from the ground. The one or more ramps may function to allow for loading and unloading of oversized or heavy cargo that is difficult to lift, but can be slid or rolled up the one or more ramps directly into the storage area. The one or more ramps may be removably attached to the bed extension to provide users a complete ramp system for access to the storage area. For example, one or more engaging features along a proximal end of the one or more ramps may attach to the one or more slots of the bed extension when the bed extension is in a fully-open position. The engaging feature may be a hook mechanism, slot, clip, connector, press-fit, thread, or a combination thereof. The one or more ramps may be structurally rigid to support the weight of oversized or heavy cargo. The one or more ramps may be stored within the cavity of the tailgate door when not in use, and may be secured in the cavity by the crossmember. For example, the crossmember may be integrally formed or attached to the tailgate door along a width of the tailgate door so that the ramps are slid beneath the crossmember and positioned within the cavity for storage. The crossmember may be permanently fixed or removably attached to the tailgate door. For example, the crossmember may be pivotally engaged along a first end with the tailgate door and may include a latch at an opposing second end so that the crossmember may be unlocked from the tailgate door and pivoted away from the cavity to insert the ramps. When stored, the one or more ramps may be covered by a panel pivotally attached to the tailgate door by one or more hinges to protect the one or more ramps from debris, moisture, other environmental elements, or a combination thereof.

In addition to the ramps, one or more accessories may be secured to the bed extension. The accessories may be secured to the bed extension in the fully-open position, semi-open position, closed position, or a combination thereof. The accessories may be secured to the bed extension using one or more engaging features similar to the ramps. The accessories may be secured to the bed extension using one or more engaging features dissimilar to the engaging features of the ramps. For example, the accessories may be secured to the bed extension using clips, hooks, latches, hook-and-loop attachments, pins, keys, adhesives, or a combination thereof. The accessories may be any secondary attachment. For example, the accessories may include: a grill, a toolbox and/or individual tools (e.g., a drill, hammer, saw, wrench, screwdriver, wire cutters, etc., or a combination thereof), steps, a cargo pod and/or storage basket, an additional bed extension, table, seat, bike rack, motorized lift, air compressor, generator, work light, cooler, or a combination thereof. The accessories may be removably attached to the bed extension so that the accessories may be stored in the storage area of the vehicle, the cabin of the vehicle, or both. When secured to the bed extension, the accessories may be mounted on a surface of the bed extension, extend from one or more peripheral edges of the bed extension, hang from the bed extension, or a combination thereof.

FIG. 1A illustrates a perspective view of a tailgate system 10 in a fully-open position. The tailgate system 10 includes a tailgate door 20. The tailgate door 20 includes one or more locking mechanisms 58 and one or more engaging protrusions 62 on an exterior side for securing the tailgate door 20 to a bed of a vehicle (not shown). The tailgate door 20 includes a crossmember 90. A panel 70 is mounted to the tailgate door 20 by one or more hinges 80. The panel includes a slot 40. One or more lug portions 34 of a bed extension 30 are pivotally engaged with one or more bosses 32 of the tailgate door 20, and secured with one or more fasteners 100. The bed extension 30 is shown in an open position with an angle $\theta$ of approximately 210 degrees from the surface of the tailgate door 20. One or more ramps 60 are removably attached to the bed extension 30 by one or more engaging features 52. One or more latches 50 fixedly attached to the bed extension 30 can be removably attached to one or more receiving features 56 of the tailgate door 20 to secure the bed extension 30 to the tailgate door 20.

Figure 1B:
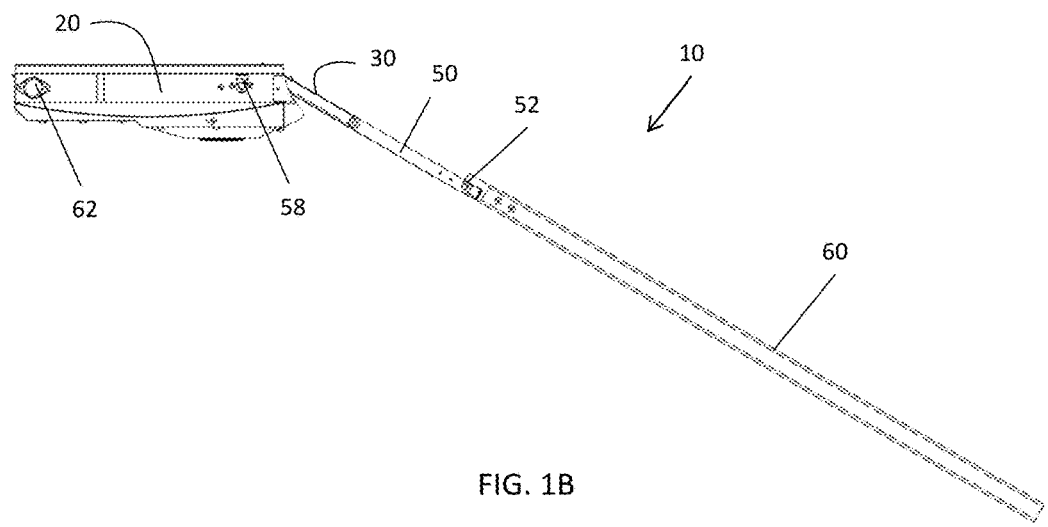
FIG. 1B illustrates a side view of a tailgate system in a fully-open position.

FIG. 1B illustrates a side view of a tailgate system 10 in a fully-open position. The tailgate system 10 includes a tailgate door 20 having one or more locking mechanisms 58 and one or more protrusions 62 on an exterior side for securing the tailgate door 20 to a bed of a vehicle (not shown). A bed extension 30 is secured to the tailgate door 20. One or more latches 50 are secured to the bed extension 30 and shown in an unlocked position. One or more ramps 60 are removably attached to the bed extension 30 by one or more engaging features 52.

FIG. 1C illustrates a front view of a tailgate system 10 in a fully-open position. The tailgate system 10 includes a tailgate door 20. The tailgate door 20 includes a handle 110 slidably engaged to a track 112 to move a plurality of blocks within the tailgate door 20 between an engaged position and a disengaged position (see FIGS. 7 and 8). A bed extension 30 is pivotally engaged to the tailgate door 20 by one or more lug portions 34. One or more ramps 60 are removably attached to one or more slots 40 of the bed extension 30.

FIG. 1D illustrates a rear view of a tailgate system 10 in a fully-open position. The tailgate system 10 includes a tailgate door 20. A panel 70 is attached to the tailgate door 20 by one or more hinges 80. A bed extension 30 is attached to the tailgate door 20 by one or more lug portions 34. One or more ramps 60 are removably attached to the bed extension 30.

Figure 2A:
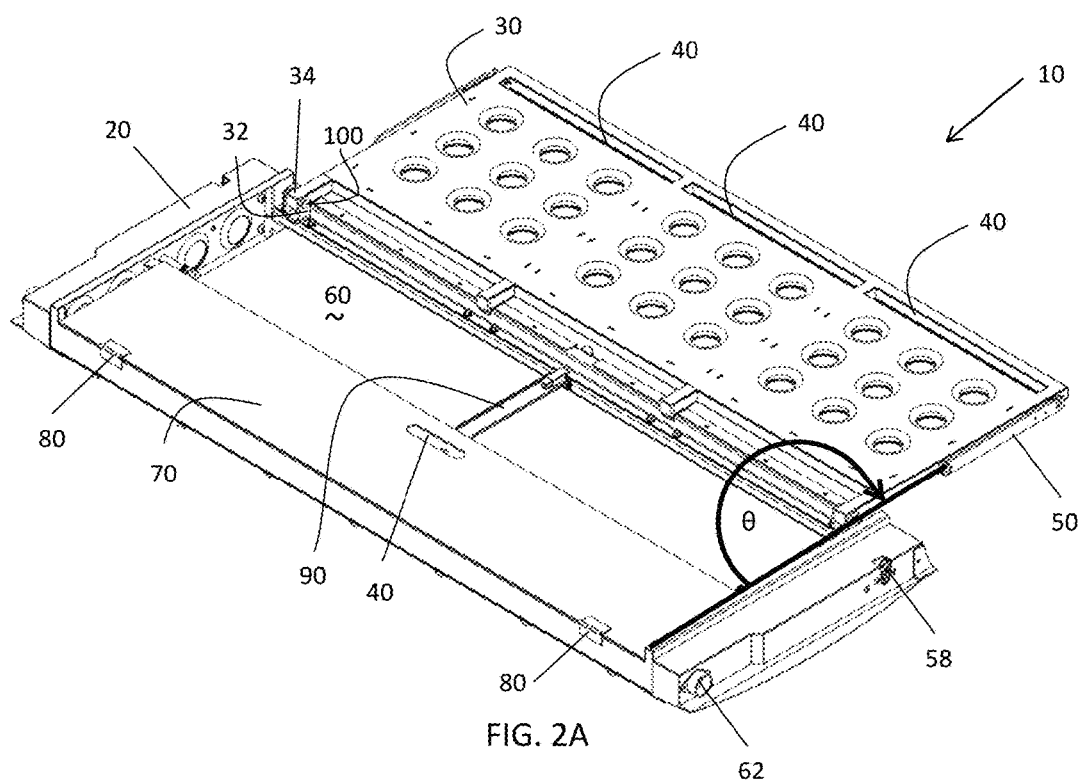
FIG. 2A illustrates a perspective view of a tailgate system in a semi-open position.

FIG. 2A illustrates a perspective view of a tailgate system 10 in a semi-open position. The tailgate system 10 includes a tailgate door 20. The tailgate door 20 includes one or more locking mechanisms 58 and one or more protrusions 62 on an exterior side for securing the tailgate door 20 to a bed of a vehicle (not shown). The tailgate door 20 includes a crossmember 90. A panel 70 is mounted to the tailgate door 20 by one or more hinges 80. The panel 70 includes a slot 40. One or more lug portions 34 of a bed extension 30 are pivotally engaged with one or more bosses 32 of the tailgate door 20, and secured with one or more fasteners 100. The bed extension 30 is shown in a semi-open position with an angle θ of approximately 180 degrees from the surface of the tailgate door 20. The bed extension 30 includes one or more slots 40. One or more latches 50 fixedly attached to the bed extension 30 can be removably attached to the tailgate door 20 to secure the bed extension 30 to the tailgate door 20. One or more ramps 60 are stored within the confines of the tailgate door 20 and secured by the crossmember 90 and panel 70.

Figure 2B:
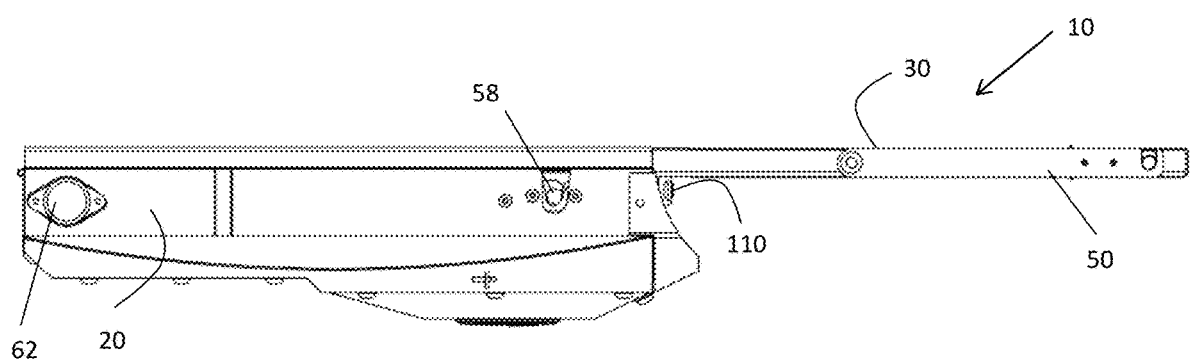
FIG. 2B illustrates a side view of a tailgate system in a semi-open position.

FIG. 2B illustrates a side view of a tailgate system 10 in a semi-open position. The tailgate system 10 includes a tailgate door 20 having one or more locking mechanisms 58 and one or more protrusions 62 on an exterior side for securing the tailgate door 20 to a bed of a vehicle (not shown). The tailgate door 20 further includes a handle 110 slidably engaged to a track to move a plurality of blocks within the tailgate door 20 between an engaged position and a disengaged position to maintain the semi-open position of the tailgate system 10 (see FIGS. 7 and 8). A bed extension 30 is secured to the tailgate door 20. One or more latches 50 are secured to the bed extension 30 and shown in an unlocked position.

Figure 3A:
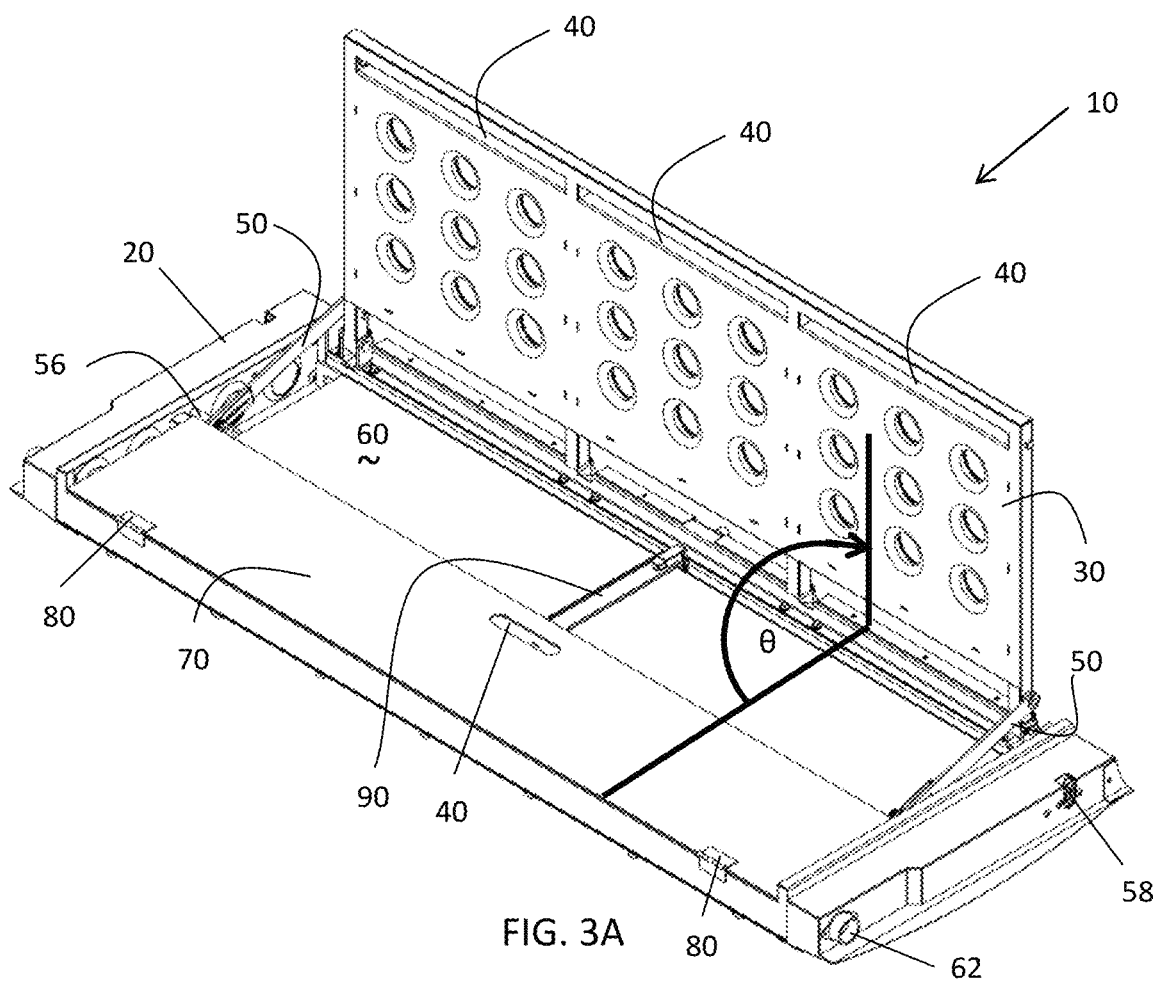
FIG. 3A illustrates a perspective view of a tailgate system in an upright position.

FIG. 3A illustrates a perspective view of a tailgate system 10 in an upright position. The tailgate system 10 includes a tailgate door 20. The tailgate door 20 includes one or more locking mechanisms 58 and one or more protrusions 62 on an exterior side for securing the tailgate door 20 to a bed of a vehicle (not shown). The tailgate door 20 includes a crossmember 90. A panel 70 is mounted to the tailgate door 20 by one or more hinges 80. The panel 70 includes a slot 40. A bed extension 30 is shown in an upright position with an angle θ of approximately 90 degrees from the surface of the tailgate door 20. The bed extension 30 includes one or more slots 40. One or more latches 50 fixedly attached to the bed extension 30 are removably attached to one or more receiving features 56 of the tailgate door 20 to secure the bed extension 30 to the tailgate door 20. One or more ramps 60 are stored within the confines of the tailgate door 20 and secured by the crossmember 90 and panel 70.

Figure 3B:
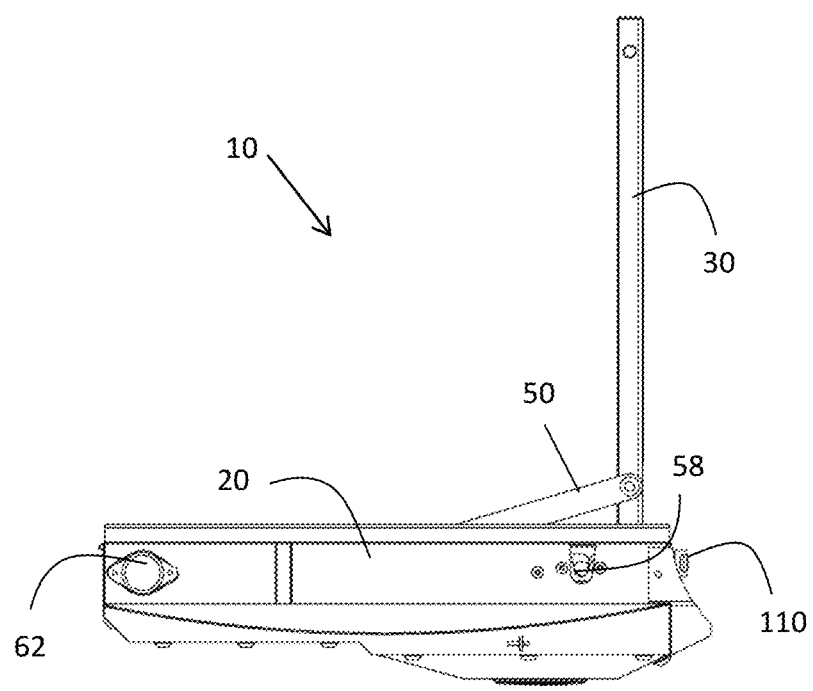
FIG. 3B illustrates a side view of a tailgate system in an upright position.

FIG. 3B illustrates a side view of a tailgate system 10 in an upright position. The tailgate system 10 includes a tailgate door 20 having one or more locking mechanisms 58 and one or more protrusions 62 on an exterior side for securing the tailgate door 20 to a bed of a vehicle (not shown). The tailgate door 20 further includes a handle 110 slidably engaged to a track to move a plurality of blocks within the tailgate door 20 between an engaged position and a disengaged position (see FIGS. 7 and 8). A bed extension 30 is secured to the tailgate door 20 by one or more latches 50.

Figure 3C:
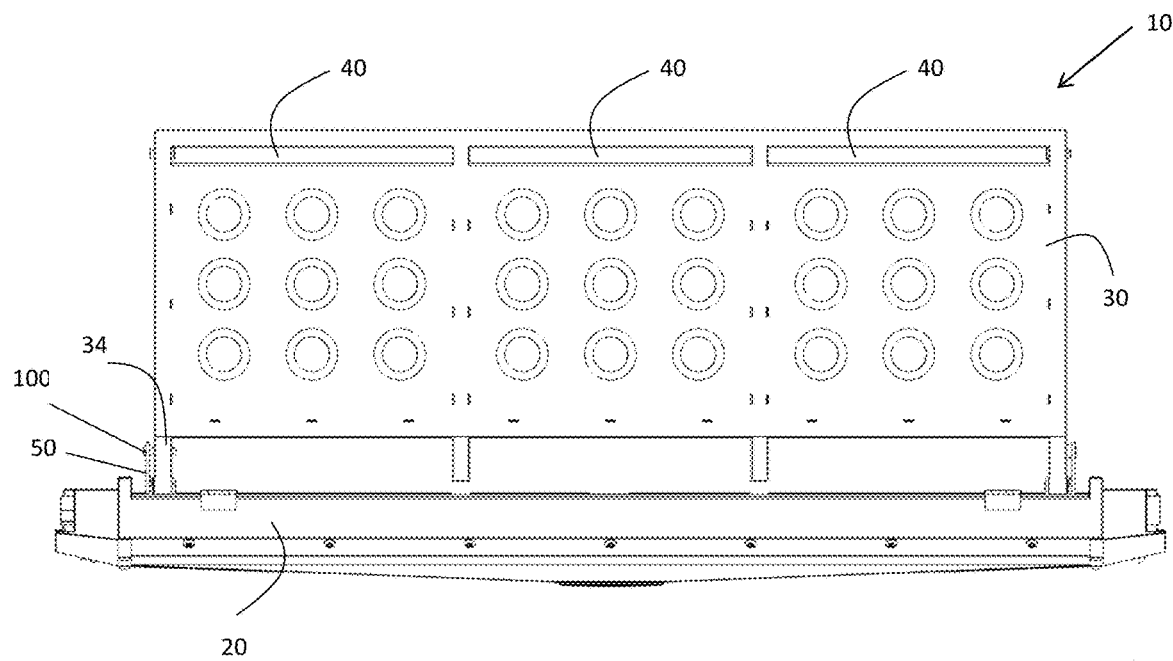
FIG. 3C illustrates a rear view of a tailgate system in an upright position.

FIG. 3C illustrates a rear view of a tailgate system 10 in an upright position. The tailgate system 10 includes a tailgate door 20. One or more lug portions 34 of a bed extension 30 are pivotally engaged with the tailgate door 20, and secured with one or more fasteners 100. One or more latches 50 fixedly attached to the bed extension 30 are removably attached to the tailgate door 20 to secure the bed extension 30 to the tailgate door 20. The bed extension 30 includes one or more slots 40.

Figure 4A:
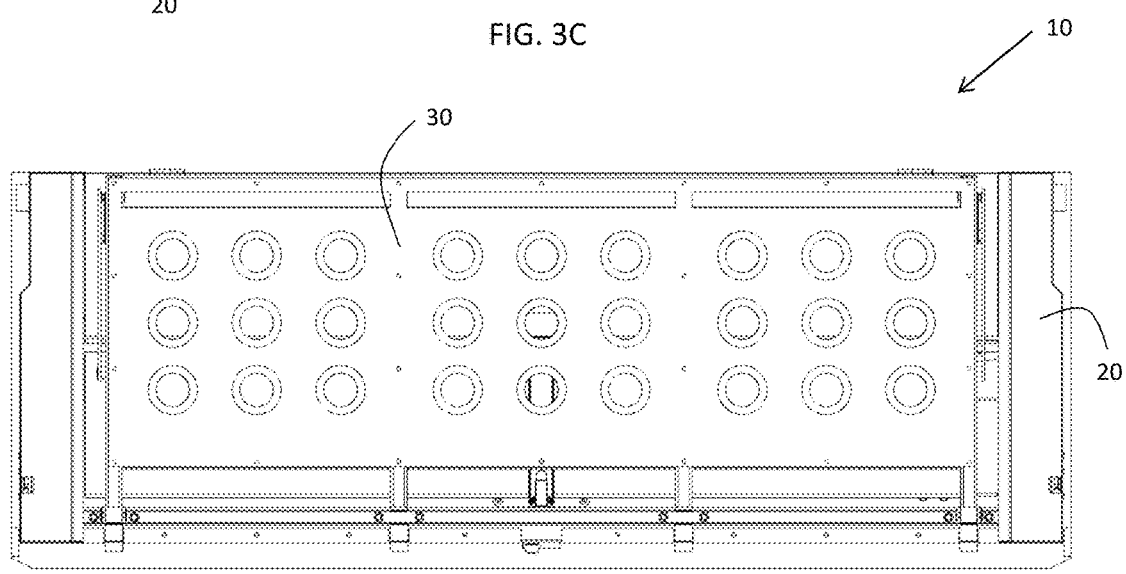
FIG. 4A illustrates a top view of a tailgate system in a closed position.

FIG. 4A illustrates a top view of a tailgate system 10 in a closed position. The tailgate system 10 includes a tailgate door 20. A bed extension 30 is positioned substantially flush to a surface of the tailgate door 20.

Figure 4B:
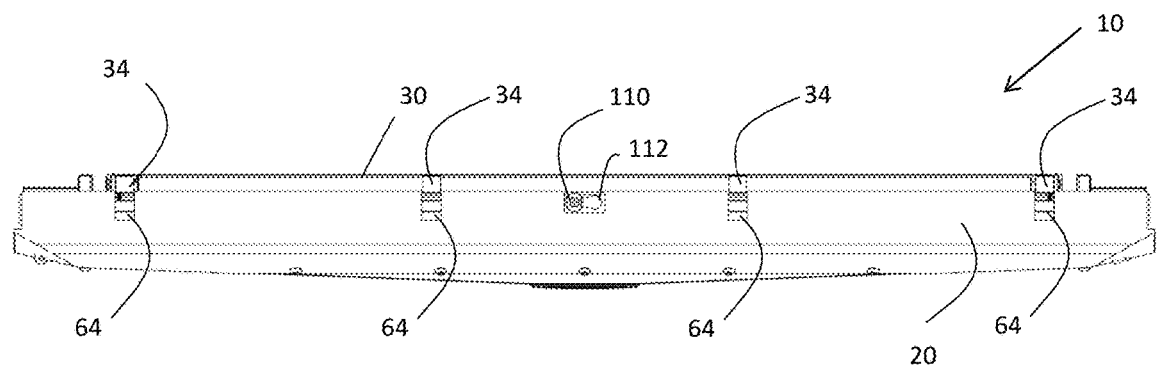
FIG. 4B illustrates a front view of a tailgate system in a closed position.

FIG. 4B illustrates a front view of a tailgate system 10 in a closed position. The tailgate system 10 includes a tailgate door 20. One or more lug portions 34 of a bed extension 30 are pivotally engaged with the tailgate door 20. The bed extension 30 is positioned substantially flush to a surface of the tailgate door 20. However, it should be noted that when the bed extension 30 pivots in relation to the tailgate door 20, the lug portions 34 of the bed extension are received by a plurality of notches 64 in the tailgate door 20, thereby allowing the bed extension 30 to pivot to a fully open position (see FIGS. 1A-1D). Alternatively, a handle 110 slidably engaged to a track 112 of the tailgate door 20 moves a plurality of blocks within the tailgate door 20 between an engaged position and a disengaged position (see FIGS. 7 and 8). In the engaged position, the plurality of blocks are located within the notches 64 so that the lug portions 34 rest on the plurality of blocks and maintain a semi-open position of the tailgate system 10.

Figure 4C:
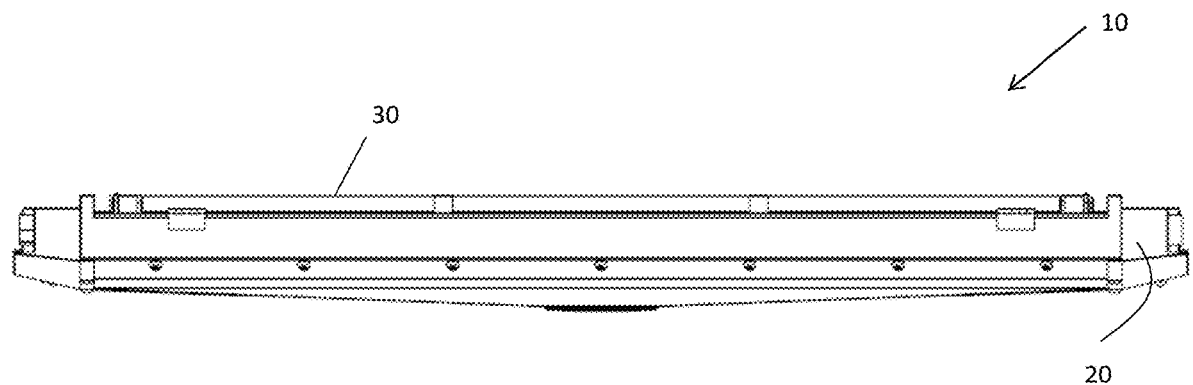
FIG. 4C illustrates a rear view of a tailgate system in a closed position.

FIG. 4C illustrates a rear view of a tailgate system 10 in a closed position. The tailgate system 10 includes a tailgate door 20. A bed extension 30 is positioned substantially flush to a surface of the tailgate door 20.

Figure 5:
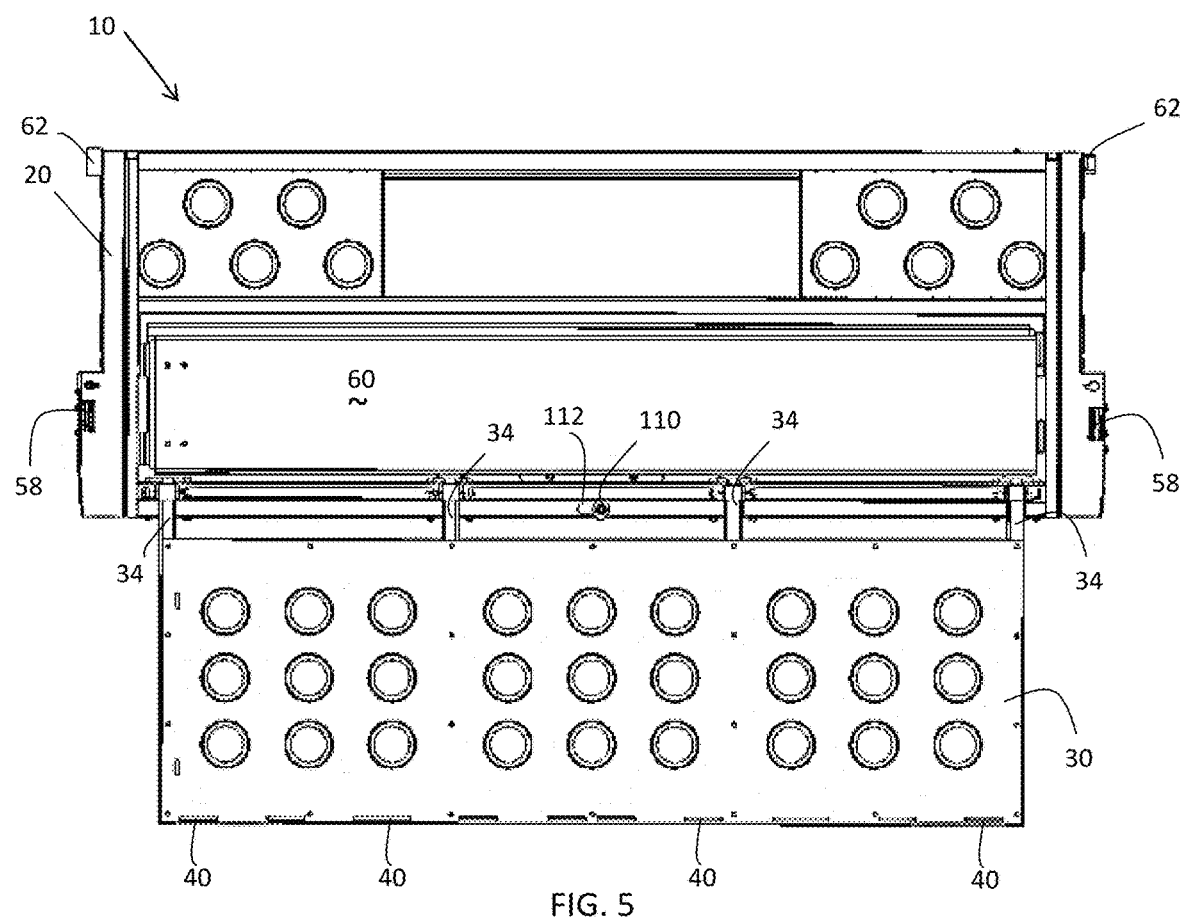
FIG. 5 illustrates a top view of a tailgate system in a semi-open position.

FIG. 5 illustrates a top view of a tailgate system 10 in a semi-open position. The tailgate system 10 includes a tailgate door 20. The tailgate door 20 includes one or more locking mechanisms 58 and one or more protrusions 62 on an exterior side for securing the tailgate door 20 to a bed of a vehicle (not shown). The tailgate door 20 further includes a handle 110 slidably engaged to a track 112 to move a plurality of blocks within the tailgate door 20 between an engaged position and a disengaged position (see FIGS. 7 and 8). One or more lug portions 34 of a bed extension 30 are pivotally engaged with one or more bosses of the tailgate door 20, and secured with one or more fasteners (see FIG.

2A). The bed extension 30 includes one or more slots 40 to secure one or more ramps 60, one or more accessories, or both. The one or more ramps 60 are stored within the confines of the tailgate door 20.

Figure 6:
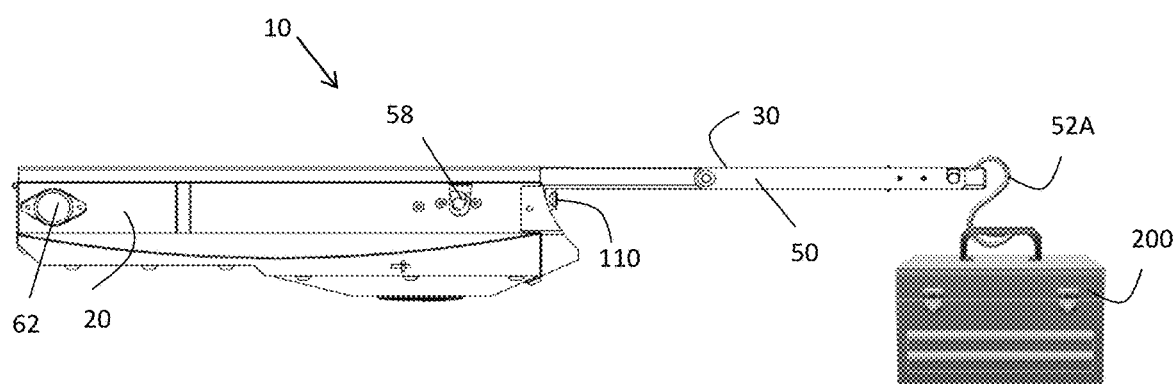
FIG. 6 illustrates a side view of an accessory attached to a bed extension of a tailgate system in a semi-open position.

FIG. 6 illustrates a side view of a tailgate system 10 in a semi-open position. The tailgate system 10 includes a tailgate door 20 having one or more locking mechanisms 58 and one or more protrusions 62 on an exterior side for securing the tailgate door 20 to a bed of a vehicle (not shown). The tailgate door 20 further includes a handle 110 slidably engaged to a track to move a plurality of blocks within the tailgate door 20 between an engaged position and a disengaged position (see FIGS. 7 and 8). A bed extension 30 is secured to the tailgate door 20. One or more latches 50 are secured to the bed extension 30 and shown in an unlocked position. An accessory 200 is secured to one or more slots of the bed extension 30 via an engaging feature 52 that is a hook 52A (see FIG. 5).

Figure 7:
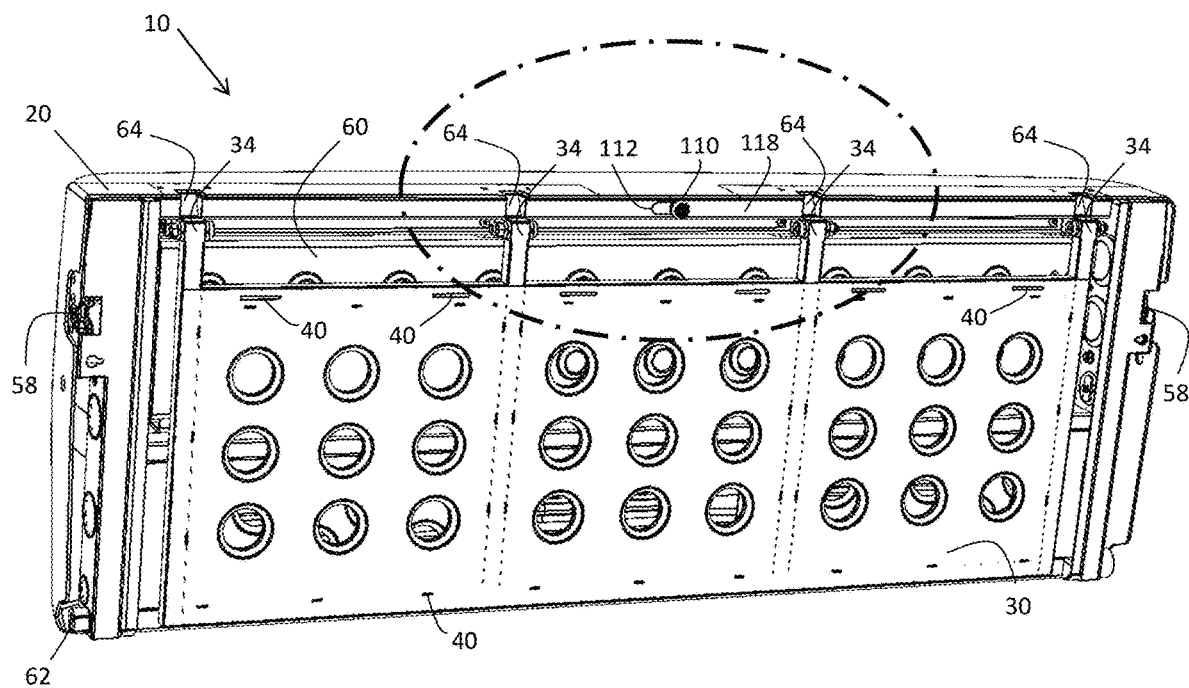
FIG. 7 illustrates a perspective view of a tailgate system in a closed position.

FIG. 7 illustrates a perspective view of a tailgate system 10 in a closed position. The tailgate system 10 includes a tailgate door 20. The tailgate door 20 includes one or more locking mechanisms 58 and one or more protrusions 62 on an exterior side for securing the tailgate door 20 to a bed of a vehicle (not shown). The tailgate door 20 further includes a handle 110 slidably engaged to a track 112 to move a plurality of blocks within a channel 118 of the tailgate door 20 between an engaged position and a disengaged position (see FIG. 8). One or more lug portions 34 of a bed extension 30 are pivotally engaged with one or more bosses of the tailgate door 20, and secured with one or more fasteners (see FIG. 8). When the bed extension 30 pivots in relation to the tailgate door 20, the lug portions 34 of the bed extension are received by a plurality of notches 64 in the tailgate door 20, thereby allowing the bed extension 30 to pivot to a fully open position (see FIGS. 1A-1D). Alternatively, when the plurality of blocks are in the engaged position, the plurality of blocks are located within the notches 64 so that the lug portions 34 rest on the plurality of blocks and maintain a semi-open position of the tailgate system 10 (see FIGS. 2A and 8). The bed extension 30 includes one or more slots 40 to secure one or more ramps 60, one or more accessories, or both. The one or more ramps 60 are stored within the confines of the tailgate door 20.

Figure 8:
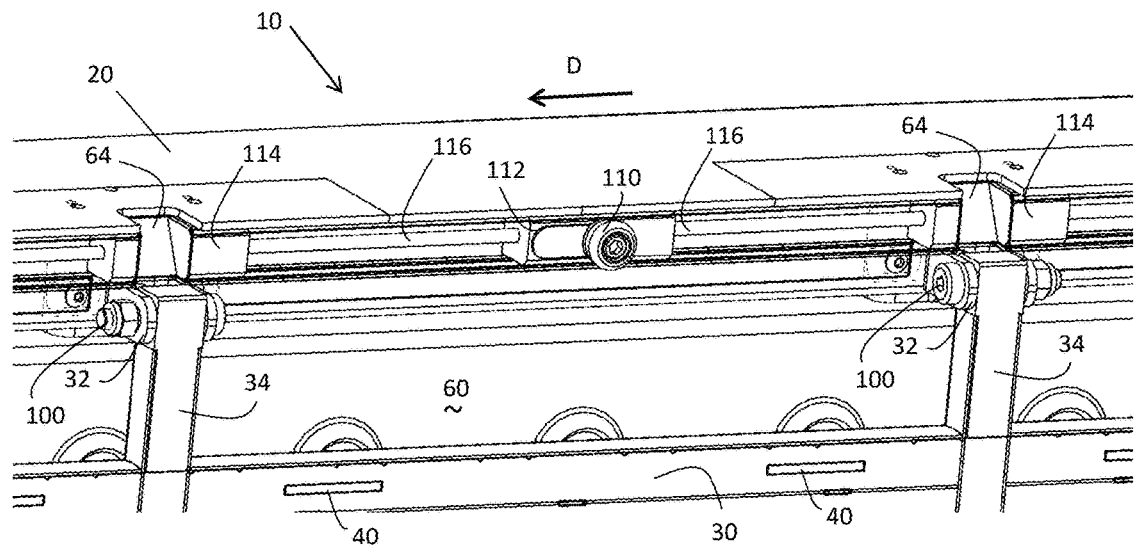
FIG. 8 illustrates a close-up perspective view of the tailgate system of FIG. 7.

FIG. 8 illustrates a close-up perspective view of the tailgate system 10 of FIG. 7. The tailgate system 10 includes a tailgate door 20. The tailgate door 20 includes a handle 110 slidably engaged to a track 112 to move a plurality of blocks 114 within a channel (not shown; see FIG. 7) of the tailgate door 20 between an engaged position and a disengaged position. One or more lug portions 34 of a bed extension 30 are pivotally engaged with one or more bosses 32 of the tailgate door 20, and secured with one or more fasteners 100. When the bed extension 30 pivots in relation to the tailgate door 20, the lug portions 34 of the bed extension are received by a plurality of notches 64 in the tailgate door 20, thereby allowing the bed extension 30 to pivot to a fully open position (see FIGS. 1A-1D). Alternatively, when the handle 110 is moved in a direction (D), the plurality of blocks 114 interconnected by rods 116 are moved to the engaged position, whereby the plurality of blocks 114 are positioned within the notches 64 so that the lug portions 34 rest on the plurality of blocks 114 and maintain a semi-open position of the tailgate system 10 (see FIG. 8). The bed extension 30 includes one or more slots 40 to secure one or more ramps 60, one or more accessories, or both. The one or more ramps 60 are stored within the confines of the tailgate door 20.

Figure 9:
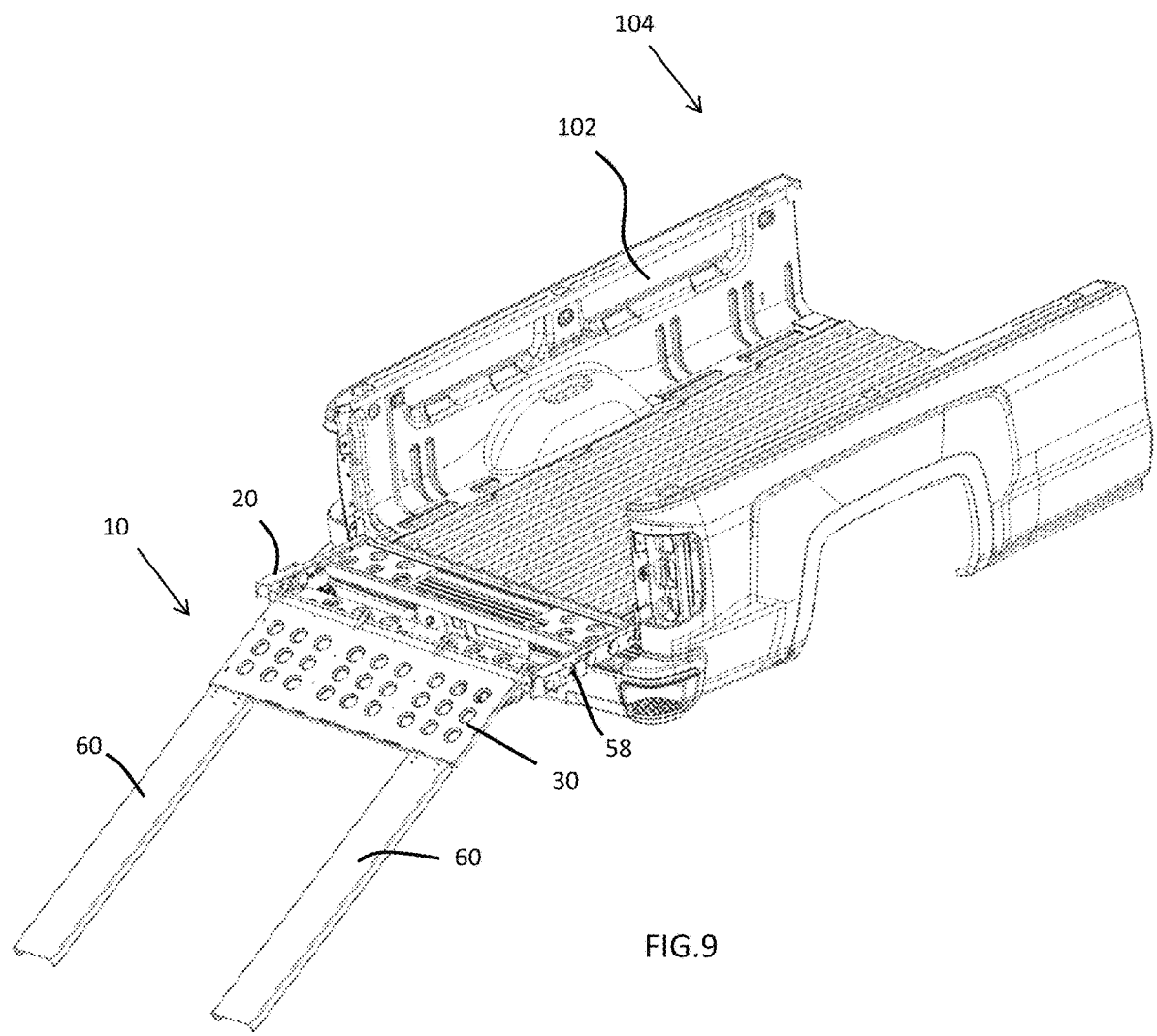
FIG. 9 illustrates a perspective view of a tailgate system connected to a cargo area of a vehicle.

FIG. 9 illustrates a perspective view of a tailgate system 10. The tailgate system 10 includes a tailgate door 20 pivotally engaged to a bed extension 30 (see FIG. 1A). A pair of ramps 60 are secured to the bed extension 30. As illustrated, the tailgate door 20 includes one or more locking mechanisms 58 on an exterior side for securing the tailgate door 20 to the cargo area 102 of the vehicle.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A tailgate system, comprising:
   a. a tailgate door that pivotally engages a rear cargo area of a vehicle between a closed position and an open position, the tailgate door including a notch along an edge thereof and a channel, wherein a moveable block positioned within the channel moves between an engaged position and a disengaged position; and
   b. a bed extension pivotally engaged to the tailgate door that pivots from a closed position to a fully-open position when a portion of the bed extension is received by the notch of the tailgate door.

2. The tailgate system according to claim 1, wherein the bed extension also pivots to a semi-open position approximately 180 degrees from a top surface of the tailgate door.

3. The tailgate system according to claim 1, wherein the bed extension also pivots to an upright position approximately 90 degrees from a top surface of the tailgate door.

4. The tailgate system according to claim 3, wherein a latch is pivotally attached to the bed extension, and the latch is secured to a receiving feature of the tailgate door to secure the bed extension in the upright position.

5. The tailgate system according to claim 1, wherein a lug portion of the bed extension is pivotally engaged and secured to a boss of the tailgate door.

6. The tailgate system according to claim 5, wherein the notch of the tailgate door receives the lug portion to allow the bed extension to pivot from the closed position to the fully-open position.

7. The tailgate system according to claim 1, wherein, when the block is located in the engaged position, the bed extension rests on a surface of the block to maintain a semi-open position.

8. The tailgate system according to claim 7, wherein, when the block is located in the disengaged position, the bed extension is free of contact with the block and the bed extension is at least partially located within the notch of the tailgate door to maintain the fully-open position.

9. The tailgate system according to claim 1, wherein, when the bed extension is in the closed position, a bottom surface of the bed extension abuts a top surface of the tailgate door.

10. The tailgate system according to claim 1, wherein the one or more open positions includes a fully-open position approximately 210 degrees from a top surface of the tailgate door.

11. The tailgate system according to claim 1, further comprising a ramp that removably attaches to the bed extension.

12. The tailgate system according to claim 11, wherein the ramp is stored within a cavity of the tailgate door between the tailgate door and the bed extension.

13. The tailgate system according to claim 1, wherein the bed extension is secured to the tailgate door by a lug portion, and the notch of the tailgate door aligns with the lug portion to receive the lug portion in the fully-open position.

14. The tailgate system according to claim 1, wherein the block is positioned within the notch.

15. The tailgate system according to claim 14, wherein the block includes a cutout that aligns with the notch of the tailgate door in the disengaged position.

16. The tailgate system according to claim 1, wherein the block is moved by a handle secured to the block and positioned within a slot along the channel.

17. A tailgate system, comprising:
   a. a tailgate door that pivotally engages a rear cargo area of a vehicle, the tailgate door including a channel with at least one notch in the channel, wherein a moveable block positioned within the channel moves between an engaged position and a disengaged position;
   b. a bed extension pivotally engaged to the tailgate door to move from a closed position to an open position, wherein a lug of the bed extension is positioned within the notch of the channel in the open position; and
   c. one or more ramps that removably attach to a slot of the bed extension.

18. The tailgate system according to claim 17, wherein the one or more ramps are stored within a cavity of the tailgate door.

19. The tailgate system according to claim 17, wherein one or more accessories are secured to the one or more slots.

* * * * *